July 3, 1928.
E. L. BARNES
COMPRESSOR
Filed July 20, 1926
1,675,686
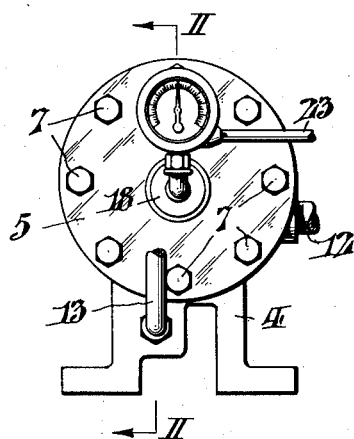
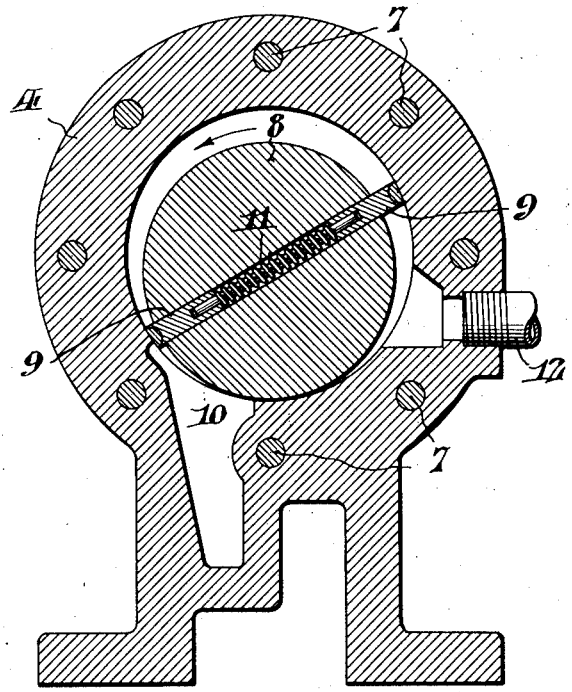
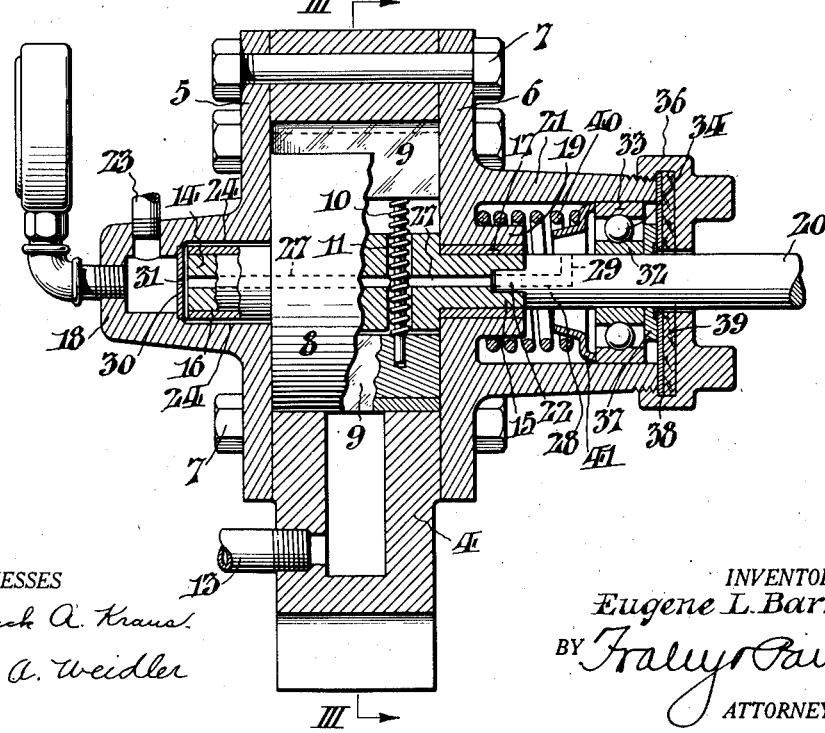
WITNESSES
Frederick A. Kraus
John A. Weidler
INVENTOR:
Eugene L. Barnes,
BY
ATTORNEYS.

Patented July 3, 1928.

1,675,686

UNITED STATES PATENT OFFICE.

EUGENE L. BARNES, OF BUFFALO, NEW YORK, ASSIGNOR TO THE BARBER ASPHALT COMPANY, OF PHILADELPHIA, PENNSYLVANIA, A CORPORATION OF WEST VIRGINIA.

COMPRESSOR.

Application filed July 20, 1926. Serial No. 123,642.

My invention relates to compressors for refrigerating systems, and is more especially concerned with bearings, sealing, and lubrication. I aim to provide a simple, inexpensive, durable and efficient apparatus, sealed securely against escape of lubricant and/or refrigerant, so as to remain fluid-tight and otherwise serviceable and efficient over long periods with very little or no attention. The invention is especially adapted and advantageous in rotary compressors for household refrigerating systems, and I have here shown and described an apparatus suitable for this purpose.

In the drawings, Fig. I shows an end elevation of a compressor suitable for the purposes of my invention.

Fig. II shows a vertical axial section through such a compressor, taken as indicated by the line II—II in Fig. I.

Fig. III shows a vertical transverse section through the compressor, taken as indicated by the line III—III in Fig. II.

The compressor here shown is of a well-known rotary wing-piston type, comprising a cylindrical-bored casing 4 with end heads 5 and 6 suitably secured thereto, as by means of bolts 7. In the casing 4 is eccentrically mounted a cylindrical rotor 8 provided with wing-pistons 9, 9, mounted in radial grooves and urged outward into contact with the interior of the casing by helical compression springs 10 in diametral bores 11 in the rotor. Vaporized refrigerant to be compressed may be admitted at 12, and the compressed refrigerant discharged at 13,—the rotor 8 turning counterclock-wise as shown in Fig. III. As shown in Fig. II, the rotor 8 has spuds or stubs 14, 15 on which hardened and ground bearing sleeves or bushings 16, 17 are tightly mounted, and revolve in bearing bosses 18 and 19 formed in the casing-heads 5 and 6. The bearing sleeve 17 mounted on the spud 15 also re-inforces the walls of a diametrical groove in the end of said spud. The rotor 8 may be driven by means of a shaft 20, mounted as hereinafter described in bearings within a hollow boss 21 on the head 6, concentric with and surrounding the boss 19. As shown in Fig. II, the shaft 20 drives the rotor 8 through a connection formed by a diametral tongue or key 22 on the end of the shaft engaging in the corresponding diametral groove above referred to as in the end of the spud 15,— which as here shown terminates flush with the ends of the bushing 17 and the boss 19. Such a connection 22 permits limited endwise movement of the shaft 20 in operation without impairment of the connection, and also renders the shaft easy to remove upon occasion.

Lubricant from any suitable source is supplied to the interior of the closed-ended boss 18 beyond the end of the spud 14, through a pipe 23. Thence it passes both to the bearing surfaces between the sleeve 16 and boss 18, and also (through grooves 24 in the interior of said boss 18, at the exterior of the sleeve 16) to the rotor 8, to lubricate its contact with the interior of the casing 5. Lubricant also passes from the interior of the boss 18 to the interior of the boss 21, through a passage or hole 27 extending axially from the outer end of the spud 14 clear through the rotor 8 and the spud 15, prolonged axially at 28 through the shaft 20, and bending radially outward at 29 to the exterior of the latter. As shown in Fig. II, the bores 11 for the springs 10 intersect the passage 27, so that the lubricant passes or oozes out around the spring 10 to assist in lubricating the movement of the pistons 9, 9 in their grooves in the rotor 8. It also oozes out between the diametral key 22 on the end of the shaft 20 and its groove in the end of the spud 15, thus lubricating those surfaces. The lubricant in the interior of the boss 21 lubricates the bearing for the shaft 20, as well as the bearing contact between the bushing 17 and the bearing in the boss 19. The flow of lubricant through the passages 24 and 27, 28, 29 may be regulated by means such as a centrally apertured sheet metal disc 30 mounted in the larger end of the bore in the boss 18 that takes the bearing sleeve 16, beyond the openings of the passages 24 around the end of said sleeve. By changing the size of the hole 31 in the disc 30, the flow of lubricant can be varied and controlled as desired.

As shown in Fig. II, the shaft 20 has an anti-friction bearing within the boss 21, comprising inner and outer races 32 and 33 with interposed rolling members 34 in the form of balls. The inner race 32 fits (snugly but not tightly) on the shaft 20, while the outer race 33 fits (snugly but not tightly) in the boss 21. The inner and outer races 32 and 33 are suitably grooved to take the balls 34.

As shown in Fig. II, the joint between the shaft 20 and the compressor casing 4 is sealed at the outer end of the boss 21, where the shaft 20 passes through a cap 36 screwed on the end of the boss. For this purpose, a shoulder 37 on the shaft 20 may revolve against a packing at the inner side of the cap 36. In the present instance, the shoulder 37 is in the form of a collar integral with the shaft 20. As here shown, the packing that co-operates with the shoulder 37 consists of a fiber disc 38 backed up and cushioned by a cork disc 39. The outer margins of the discs 38 and 39 are clamped fluid-tight against the end surface of the boss 21 by screwing up the cap 36 tightly on them. The outer face of the flange 37 that seals with the packing 38 may preferably be ground, in order to make a tight joint, and the end surface of the boss 21 may also be ground or otherwise finished accurately in order to seal tightly with the disc 38. As shown, the outer face of the flange 37 is hollowed at the center, to afford an annular bearing surface for the joint.

The tendency or bias of the shaft 20 to shift endwise outward through the cap 36 under the influence of the pressure in the interior of the boss 21 tends to press the shoulder at 37 against the packing 38. However, this tendency may be re-enforced and augmented by spring means in the interior of the boss 21, shown as a helical compression spring 40 mounted around the inner boss 19 as well as the shaft 20. The pressure of the spring 40 is preferably transmitted to the shaft 20 through the anti-friction bearing already described. As shown in Fig. II, the spring 40 exerts an outward thrust on the outer race 33 through a shouldered ring or callet 41 whose smaller portion fits into the end of the spring, and the inner race 32 bears against a shoulder afforded by the inner face of the flange 37. The end-wise pressure of the spring 40 on the outer race 33 is transmitted to the inner race 32 through the engagement of the balls 34 in the race grooves.

Having thus described my invention, I claim:

1. The combination with a shouldered rotating compressor shaft biased toward endwise movement, of a stationary packing against which the shoulder is pressed and sealed by the bias affecting the shaft as aforesaid.

2. The combination with a shouldered rotating compressor shaft, of a stationary packing for engaging the shoulder, and means for urging said shaft end-wise to press and seal its shoulder against said packing, including an anti-friction bearing.

3. The combination with a shouldered rotating compressor shaft, of a stationary packing for engaging the shoulder, spring means around the shaft for biasing it lengthwise and thereby pressing and sealing the shoulder against the packing, and an anti-friction bearing interposed between said spring means and said shaft.

4. The combination with a flanged rotating compressor shaft, of a stationary packing for engaging one side of said flange, an anti-friction bearing around the shaft with an inner race against the other side of said flange, and spring means around the shaft acting on the outer race of said bearing to press and seal said flange against said packing.

5. The combination with a compressor casing and a hollow boss thereon, of a shouldered rotating shaft in said boss biased toward endwise movement, a cap on said boss, and a packing in said cap sealed against said boss and sealing with the shoulder of the shaft.

6. The combination with a compressor casing and a hollow boss thereon, of a shouldered rotating shaft in said boss biased toward end-wise movement, a cap on said boss, a packing disc in said cap sealed against said boss and sealing with the shoulder of the shaft, and a cushion in said cap behind said packing disc.

7. The combination with a rotary compressor casing and its end heads, and aligned bearings in said heads, of a rotor in the casing with spuds in said bearings, and a shaft also mounted in one of said heads in driving engagement with the corresponding rotor spud, but movable lengthwise with reference thereto.

8. The combination with a rotary compressor casing and its end heads, and aligned bearings and oil chambers in said heads of a rotor in the casing with spuds in said bearings, a shaft also mounted in one of said heads in driving connection with the corresponding rotor spud, means for supplying oil to one of said oil chambers, and an oil passage from said chamber through the rotating parts to the other oil chamber.

In testimony whereof, I have hereunto signed my name at Buffalo N. Y. this 14th day of July 1926.

EUGENE L. BARNES.